April 17, 1951     H. C. WHITTAKER     2,549,351
SAFETY DEVICE FOR HYDRAULIC BRAKES
Filed May 23, 1949
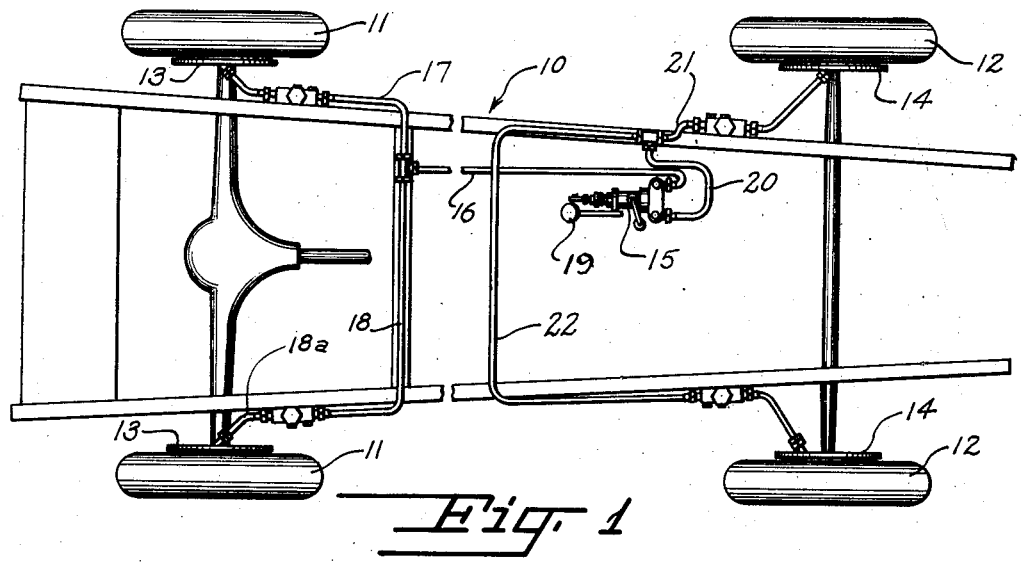
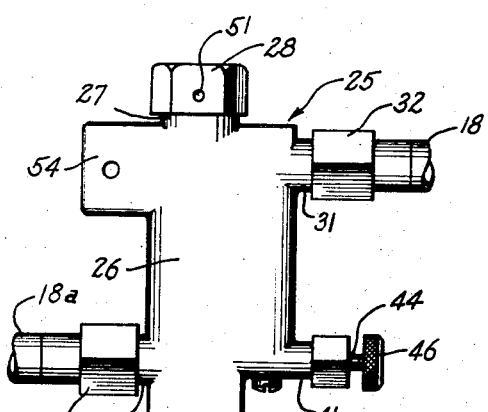
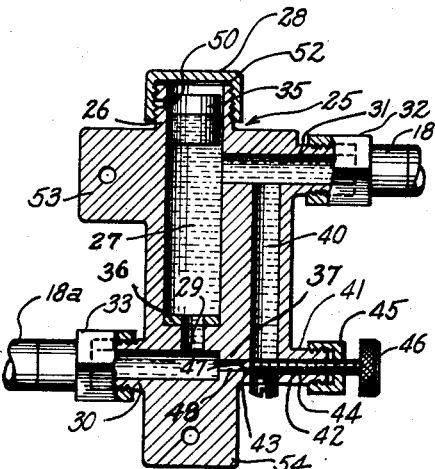
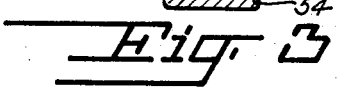
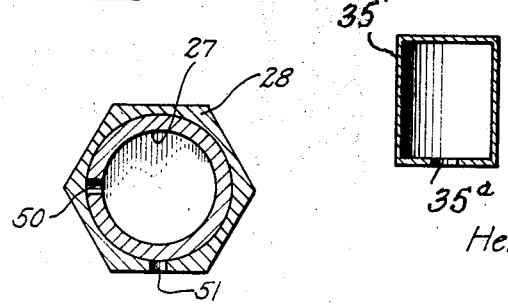
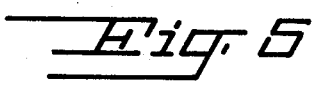
INVENTOR.
Henry C. Whittaker
ATTORNEY Patented Apr. 17, 1951

2,549,351

UNITED STATES PATENT OFFICE 2,549,351

SAFETY DEVICE FOR HYDRAULIC BRAKES

Henry Clay Whittaker, Memphis, Tenn.

Application May 23, 1949, Serial No. 94,903

2 Claims. (Cl. 303—84)

This invention relates generally to hydraulic four-wheel brakes employed by automotive vehicles and is directed more particularly to a device for preventing the loss of fluid from the hydraulic system of the brakes.

An object of the invention is the provision of a safety device which will act automatically for stopping the flow of fluid in a line when a leakage occurs in said line leading to a brake cylinder so that the other cylinders may function until the braking line has been repaired.

Another object of the invention is the provision of a safety device which may be incorporated as individual units in the lines leading from the master cylinder of a hydraulic brake system of a vehicle to the brake drums of the wheels for closing a line automatically when a leak occurs therein so that the brakes of the unaffected lines may function to control the vehicle, said safety device including a by-pass normally closed by a manually manipulated valve, but adapted to be opened temporarily for restoring the flow of fluid to the safety device and for returning the operating element of said device to a normal operating position.

A further object of the invention is the provision of a safety device for a hydraulic brake system to stop the loss of fluid from a leaking line which connects the master cylinder with one of the brake shoes of a vehicle wheel, a manually actuated valve normally closing a by-pass for fluid between the inlet and outlet of a main cylinder in the device, said valve being opened when the leaking line has been repaired so that fluid flowing through the by-pass under pressure will raise a float valve in the main cylinder to permit normal flow of the fluid through the repaired line to the associated brake drum.

This invention is best understood from a consideration of the following detailed description in connection with the accompanying drawings, nevertheless it is to be borne in mind that the invention is not confined to the disclosure, but is susceptible of such changes and modifications as shall define no material departure from the salient features of the invention as expressed in the appended claims.

In the drawings—

Figure 1 is a plan view of a chassis of an automobile showing my safety device incorporated in the supply lines of a four-wheel hydraulic braking system;

Figure 2 is an enlarged side view of a safety device detached from the system;

Figure 3 is a longitudinal vertical section of the safety device;

Figure 4 is an enlarged horizontal sectional view taken on the line 4—4 of Figure 2; and Figure 5 is a vertical section through a modified form of float valve which may be employed in the device.

Referring more particularly to the drawings, 10 designates the chassis of an automobile supported by front wheels 11 and rear wheels 12 which are equipped with the usual brake drums 13 and 14 respectively. Each brake drum is provided with the necessary elements for operating the brakes and the elements are confined within the drums.

A master cylinder 15 is supported by the chassis and supplies fluid under pressure to the operating elements of the brakes confined in drums 13 by means of a pipe 16 and branch pipes 17 and 18 when the usual brake pedal 19 is depressed. In like manner, the operating elements of the brakes confined in the drums 14 are supplied with fluid under pressure through a pipe 20, and branch pipes 21 and 22. It must be borne in mind, that the various pipes are supplied simultaneously with fluid under a uniform pressure.

A safety device illustrated more particularly in Figures 2 to 4 inclusive and designated generally by the numeral 25, is incorporated in each of the branch lines 17, 18, 21 and 22 to cut off the flow of fluid to any one of the several braking devices when a leak occurs in the associated line. This safety device comprises a casting 26 provided with a main cylinder 27 which is vertically disposed having a screw cap 28 at the upper end and a port 29 at the lower end leading into a discharge passage of a nipple 30 which is in communication with a section 18a of a branch pipe, such as 18, leading to the brake-operating elements in the drum 13. A hollow nipple 31 is in communication with the main section of the branch pipe 18. A union 32 is threaded onto nipple 31 for attaching the outer end of the branch pipe 18 to said nipple. Similarly, a union 33 attaches the section 18a to the hollow nipple 30.

A float 35 is disposed in the cylinder 27 and is raised when the cylinder 27 is filled with fluid. It will be noted that said float during normal conditions of operation is maintained above the inlet of the horizontally disposed hollow nipple 31 by the fluid in the cylinder 27. The float 35 is adapted to seat upon a gasket 36 surrounding the passage 29 when the float has been lowered by the release of fluid in said cylinder because of a leak, for closing completely the flow of fluid in the associated branch pipe.

A by-pass 40 leads from the hollow nipple 31 to a hollow boss 41 which has a passage 42 connecting the by-pass with the hollow nipple 30. A valve 43 has a stem 44 threaded at 45 into the outer free end of the boss. A head 46 on the outer end of the stem is employed to adjust the valve 43 onto or away from a seat 47 in a wall 37 between the port 40 and the nipple 30. An opening 48 at said seat places the by-pass 40 in communication with the nipple when the valve 43 is withdrawn from said seat.

The cap 28 is threaded onto the upper end of the vertical cylinder 27 which has a bleeder port 50. This port is closed normally by the cap. A cooperating port 51 is formed in the cap and is disposed at an angle of 90° from the port 50. A gasket 52 is seated on the upper end of the cylinder 27. Said ports are aligned by adjusting the cap 28 to permit the escape of air from the cylinder when the cylinder is being refilled with the fluid after the level of the fluid, such as an oil, has been lowered.

The casting 26 is provided with perforated lugs 53 and 54 for attaching the safety device in position in the various branch lines. It will be noted that each branch pipe has its individual safety device and said devices are identical in construction.

The operation of my device is as follows:

When a leak occurs in one of the branch pipes, the draining of the associated cylinder will lower the float 35 until said valve is seated on the gasket around the port 29 when the flow of fluid through said branch pipe will be cut off. The valve 43 is closed normally so that the supply of fluid from the master cylinder 15 cannot reach the section 18a and will be maintained in closed condition until the leak has been repaired.

When the repairs have been completed, the stem 44 will be unscrewed to release the valve 43 after cap 28 has been turned to align the ports 50 and 51. The pedal 19 will be depressed to force fluid under pressure through the nipple 31, the by-pass 40, the hollow boss 41 and the nipple 30 and the section 18a. The fluid under pressure will raise the float 35 and fill the cylinder 27. When fluid begins to flow from the ports 50 and 51 the cap will be turned to close said ports. The valve 43 is closed and the braking elements associated with the repaired line will be in working condition. The nipple 31 and pipe 18 in effect form a supply conduit while the nipple 30 and pipe 18a constitute a discharge conduit.

In Figure 5 a modified form of float 35' is shown wherein the lower wall is provided with an opening 35a which has been found desirable in cars having light braking actions.

What I claim:

1. In a fluid operated brake system, a vertical cylinder having a discharge port at the lower end, a supply conduit communicating with the cylinder intermediate the top and bottom thereof, a discharge conduit, said discharge port connecting the cylinder with discharge conduit, a hollow boss in axial alignment with the discharge conduit and provided with a discharge port connecting the boss with the discharge conduit adjacent said discharge port at the lower end of the cylinder, a valve normally closing the discharge port in the boss, a by-pass connecting the supply conduit with the hollow boss, a float in the cylinder normally elevated above the supply conduit, but movable to close the discharge port when said float is lowered by a leak in the discharge conduit, the valve in the boss being opened for supplying fluid through the by-pass to the lower end of the cylinder to raise the float after the leak has been repaired, during normal operation of the associated braking elements, the valve in the boss being closed.

2. The structure of claim 1, including a cap threaded on the upper end of the cylinder provided with a bleeder port, the cylinder having a bleeder port in the side wall thereof adjacent the port in the cap, the port in the cap adapted to be aligned with the bleeder port in the cylinder to permit the escape of air when the cylinder is being filled with fluid.

HENRY CLAY WHITTAKER.

REFERENCES CITED

The following references are of record in the file of this patent:

UNITED STATES PATENTS

| Number | Name | Date |
|---|---|---|
| 2,058,595 | Klein | Oct. 27, 1936 |
| 2,169,462 | De Grace | Aug. 15, 1939 |

FOREIGN PATENTS

| Number | Country | Date |
|---|---|---|
| 635,209 | Germany | Sept. 12, 1936 |